Sept. 12, 1933. L. A. CAMEROTA 1,926,034
STUFFING BOX FOR BLOW PIPES
Filed Dec. 14, 1931 3 Sheets-Sheet 3
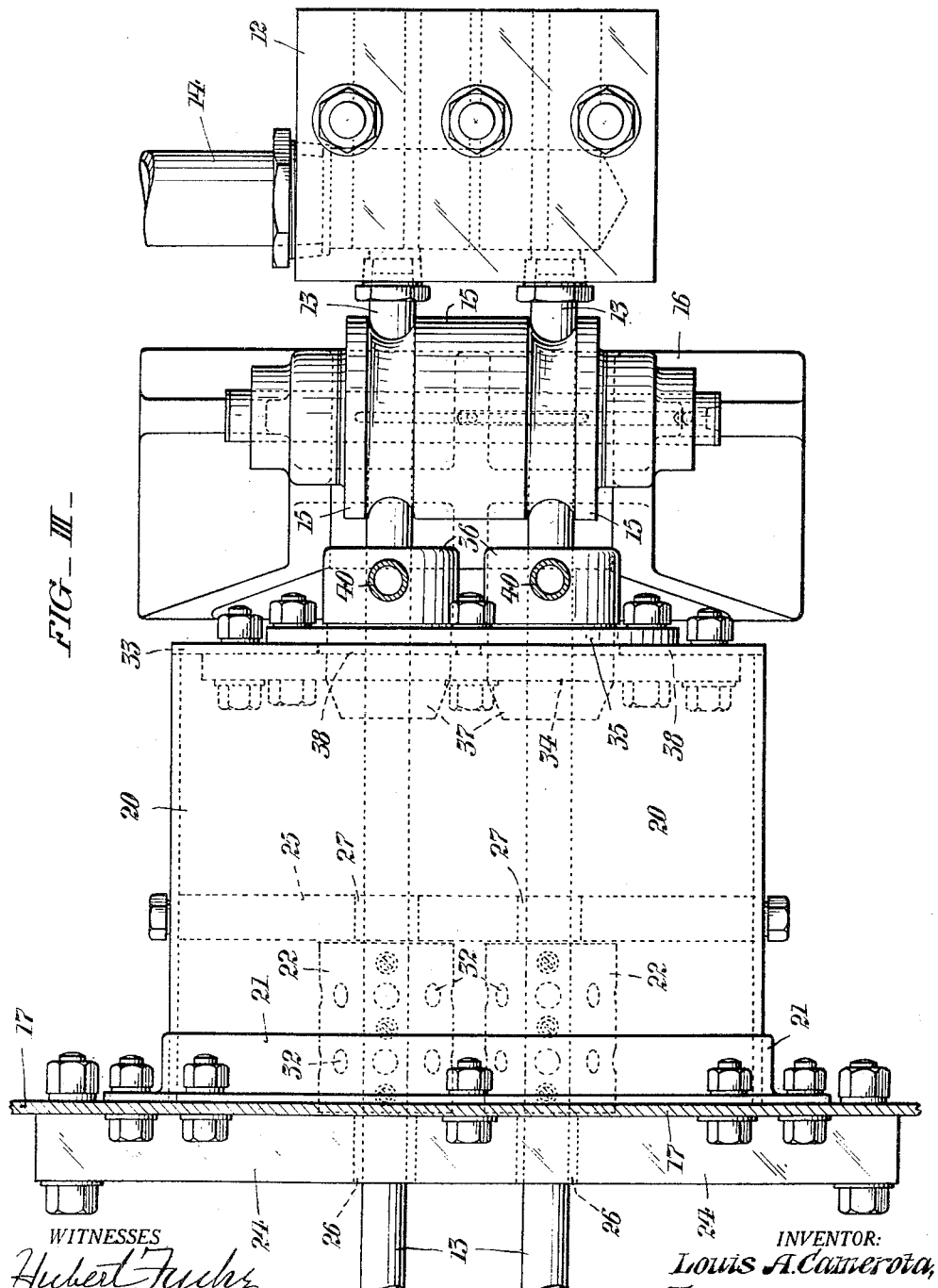

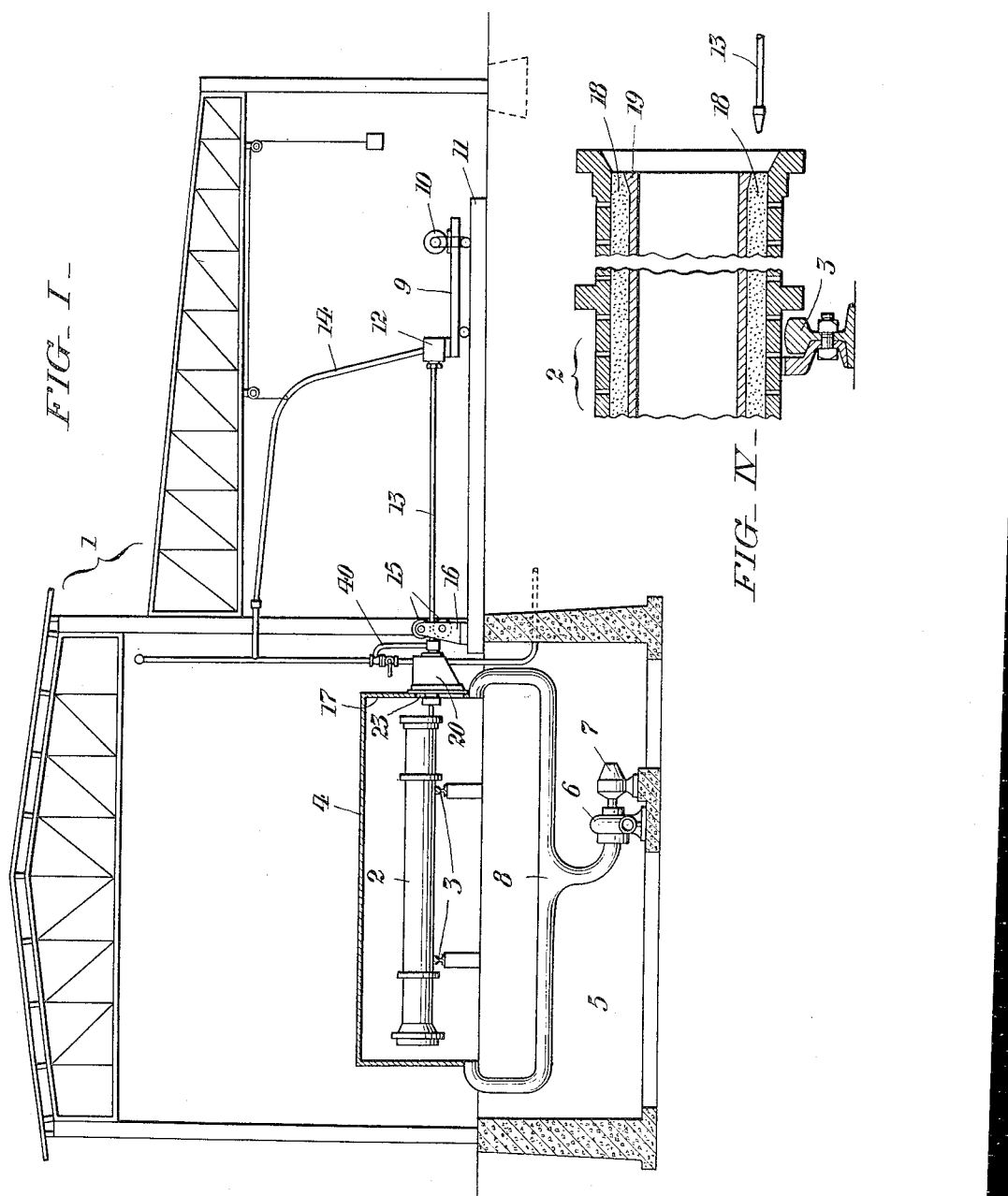

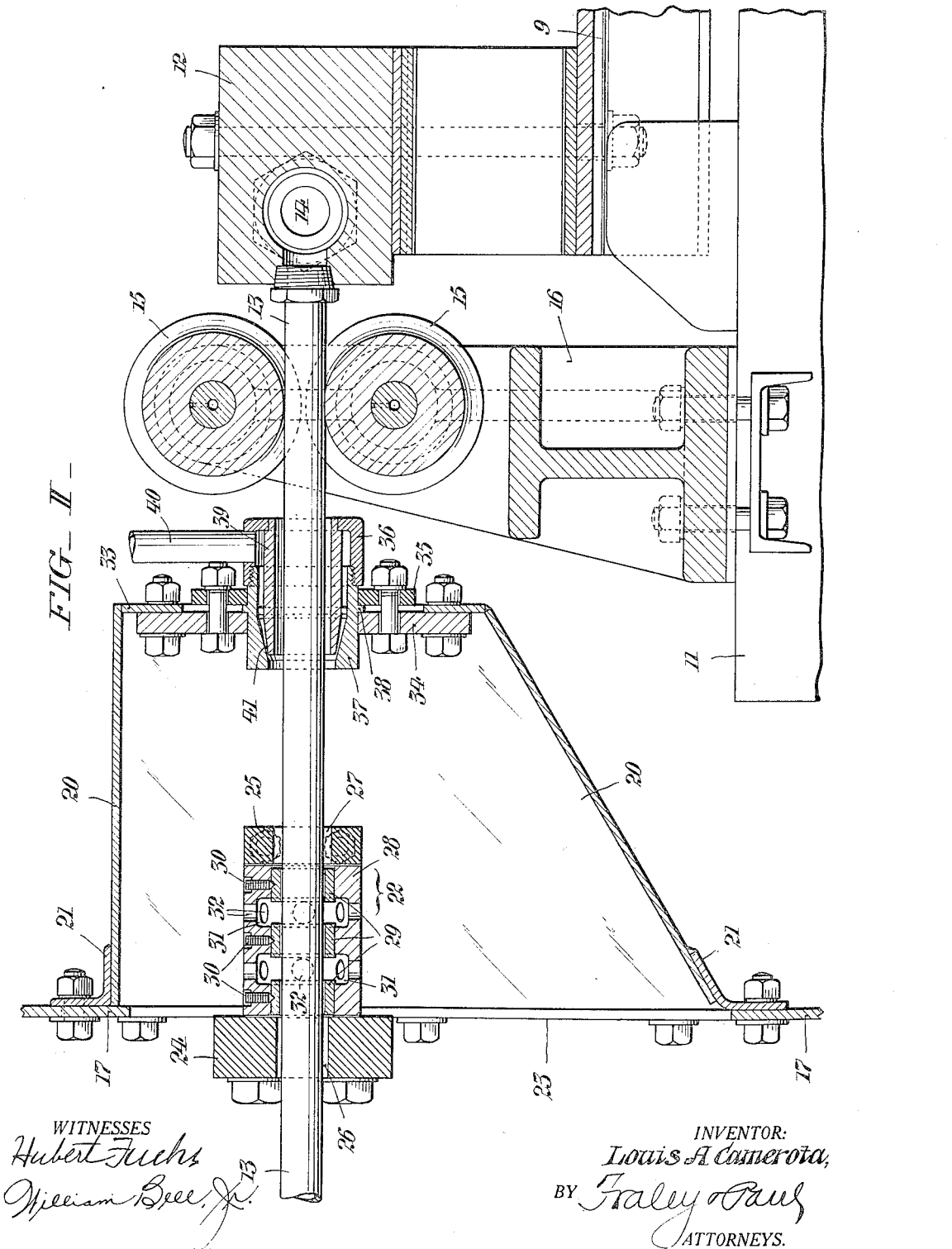

Patented Sept. 12, 1933

1,926,034

UNITED STATES PATENT OFFICE 1,926,034

STUFFING BOX FOR BLOW PIPES

Louis A. Camerota, Burlington, N. J., assignor to Walter Wood, Philadelphia, Pa.

Application December 14, 1931
Serial No. 580,912

7 Claims. (Cl. 22—1)

This invention relates to stuffing boxes for blow pipes, and more particularly to a stuffing box adapted to be mounted at the entrance to a dust box and to accommodate a blow pipe used for delivering a pressure jet within the dust box. In my U. S. Letters Patent No. 1,774,082, issued August 26, 1930, there is described a method of freeing a pipe casting from a flask lined with a refractory mold, which method involves the use of a blow pipe designed to penetrate the mold to initiate its disintegration. The boring or slotting of a sand mold by means of an air jet or the like is necessarily accompanied by a stirring up of loosened sand and dust, so that it is desirable to employ a dust collecting enclosure within which the mold disintegrating operation is to be performed, and to provide a stuffing box at the point where the blow pipe enters the dust collecting enclosure. Incident to the boring or slotting of a sand mold by means of a blow pipe, there is set up a counter blast in a reverse direction to that of the pressure jet of the blow pipe, and the abrasion caused by this counter blast of air laden with sand particles, unless effectively opposed, will soon wear away the blow pipe stuffing box.

The object, therefore, of the present invention is to provide in combination with a blow pipe stuffing box means for opposing the counter blast set up around the blow pipe, whereby the parts of the stuffing box are protected from excessive wear, and whereby the stirring up of sand, dust or the like is confined to a dust collecting enclosure, with resulting increased comfort to those working in the vicinity of the blow pipe.

It will be understood, however, that the stuffing box and the associated apparatus of this invention, though particularly adapted for use with a dust box wherein a mold disintegrating operation is performed, may be used to advantage for other purposes.

Other objects and advantages characterizing my present invention will become more fully apparent from the description of one example or embodiment thereof which follows hereinafter and has reference to the accompanying drawings. Of the drawings:

Fig. I represents a side elevation of a mold disintegrating station, wherein a stuffing box of my invention is used in connection with a dust box, which is shown in section, and a blow pipe propelled by a wheeled carriage.

Fig. II represents an enlarged cross section, showing one end of the dust box of Fig. I, the stuffing box, and parts of the blow pipe and movable carriage.

Fig. III represents a plan view of the apparatus shown in Fig. II; and,

Fig. IV represents an enlarged cross section of the end of a flask within the dust box, showing the manner in which the blow pipe is directed into the refractory mold of the flask.

In the drawings, wherein there is represented only one example of the use of my invention, there is shown a shed 1 constituting a station to which a pipe flask 2 is brought by rolling it along skids 3. A dust collecting box 4 surrounds the flask 2. To admit the flask 2 within the dust box 4, suitable hinged doors may be provided at the sides of the box where the skids 3 enter and leave the same. Preferably located in a pit 5 beneath the dust box 4, or at some other remote point, I provide an exhaust fan or blower 6 operated by a motor 7 and having exhaust trunks 8 leading from the interior of the dust box to the blower 6.

At one side of the flask station I provide a movable carriage or other suitable support 9, preferably equipped with its own motor and speed reducer diagrammatically shown at 10, and adapted to travel back and forth on rails 11 which parallel the longitudinal axis of the pipe flask 2. Mounted on the forward end of the carriage 9, there is a manifold 12 to which a pair of blow pipes 13 are connected. At the intake side of the manifold 12 there is a connection to a flexible air hose 14. The blow pipes 13 are guided toward the dust box 4 by means of a pair of grooved rollers 15. The rollers 15 are mounted, one above the other with their grooves in alignment, upon a casting 16 near the end wall 17 of the dust box 4.

With reference to Fig. IV, in which there is shown an enlarged view of one end of the pipe flask 2, it will be observed that the blow pipes 13 are directed toward the mold or annular sand lining 18 of the flask 2 at the bead end of the pipe casting 19 which is encased within the flask. Upon the corresponding end wall 17 of the dust box 4, as shown in Fig. II, there is mounted a dust collecting casing 20 which is bolted to the wall 17 by means of angle irons 21. Centrally housed within the casing 20 are two stuffing boxes 22 which are adapted to surround the blow pipes 13 and to support them at the points where they enter the end of the dust box. The end wall 17 of the dust box 4 is cut away to afford an opening 23 corresponding substantially to the shape of the dust collecting casing 20. At the opening 23 the stuffing boxes 22 are supported by means of a transverse reinforcing block 24, which is bolted to the wall 17 of the dust box, and an additional transverse bar 25, which is secured to the sides of the casing 20. The stuffing boxes 22 are clamped between the reinforcing block 24 and the bar 25 with their inner ends substantially in the plane of the wall 17 of the dust box 4. The reinforcing block 24 is provided with circular openings 26 somewhat larger than the outside diameter of the blow pipes 13 and through which the blow pipes 13 pass to the interior of the dust box 4. Similar circular openings 27 are provided in the transverse bar 25.

Each stuffing box 22 comprises a cylindrical body portion 28 and a number of packing rings 29 which afford bearing surfaces for a blow pipe 13 and which are secured in place at spaced intervals by set screws 30. Between the packing rings 29 there are annular chambers 31 having a number of radial perforations 32 through which sand or dust may be discharged into the interior of the casing 20. As shown in Fig. II the packing rings 29 do not fit tightly on the blow pipe 13 but afford appreciable clearance around the blow pipe.

At the end wall 33 of the casing 20 reinforcing plates 34 and 35 are bolted together with the wall 33 therebetween. Supported within circular openings in the plates 34 and 35 are two nozzles 36, each nozzle having its longitudinal axis in alignment with a stuffing box 22 and with a groove in a guide roller 15. Each nozzle 36 comprises a cylindrical body portion 37 having a flange 38 fitting between the plates 34 and 35, and an inner annular cylindrical member 39 surrounding a blow pipe 13. A pipe 40 carrying compressed air or the like leads to the air chamber between the inner and outer members 39 and 37. The orifice 41 at the end of each nozzle is so formed as to direct a stream of air along the blow pipe 13 in the direction of its axis and towards the stuffing box 22. The air supply through the pipe 40 to the nozzles 36 is preferably taken from the same source as that of the flexible air hose 14 leading to the manifold 12 on the movable carriage 9. Air is admitted to and cut off from the nozzles 36 preferably at the same time as air is admitted to and cut off from the blow pipes 13. The opening 23 in the end wall 17 of the dust box affords a passage permitting any sand, dust or the like which may pass through the stuffing boxes 22 to be returned to the interior of the dust box 4.

The operation of the pressure jet delivered from the blow pipes 13 into the sand lining 18 of the flask 2 to disintegrate the same, and thus enable the removal of the casting 19, is fully described in my Patent No. 1,774,082, referred to above. Incident to this operation, there is a counter blast of air laden with sand particles which travels back along the outside of the blow pipes 13 in a direction reverse to the flow of air in the blow pipes towards the stuffing boxes 22. Unless effectively resisted this counter blast will cause excessive wear at the stuffing box and will cause a stream of dust to escape through the stuffing box into the surrounding atmosphere, with annoyance to the operator at the mold disintegrating station. However, with the use of the apparatus herein described, the admission of air to the blow pipes 13 is accompanied by admission of air through the pipes 40 to the nozzles 36, which causes an additional pressure jet along the outside of the blow pipes to be directed through the packing rings 29 of the stuffing boxes 22. This current of air effectively opposes the counter blast from the flask 2, and prevents any appreciable amount of dust entering into the casing 20. Such dust or sand as does travel back along the blow pipes 13 into the stuffing boxes 22 is blown out through the radial perforations 32 and deposited at the bottom of the dust collecting casing 20, or blown back into the interior of the dust box through the opening 23 in the dust box wall 17.

It will be observed that the nozzles 36 are spaced at a distance from the ends of the stuffing boxes 22, this distance being determined by experiment, to give the most effective results. With the use of the auxiliary nozzles 36 in the manner described, the life of the packing rings 29 of the stuffing box may be considerably prolonged. While there may be some escape of sand, dust, or other particles through the stuffing boxes, such particles are confined to the limits of the casing 20, or blown back into the interior of the dust box 4 from whence they are carried off by the exhaust fan 7. Furthermore, there is virtually no wear on the nozzles 36. The greatest wear takes place at the reinforcing blocks 24, which may be readily replaced and which are made of such thickness as to last for a long time.

While I have described my invention with relation to its application to a dust box in which a mold disintegrating operation is performed by means of an air jet, it will be apparent that the stuffing boxes and the apparatus associated with them may be used to advantage for many other purposes. In using the term "dust box" I mean to include any form of enclosure, irrespective of shape, wherein dust, fine sand, or other particles are stirred up, and in using the term "blow pipe", I mean to include any form of pipe or conduit from which compressed air, or some other liquid or gaseous medium, issues in a jet or stream.

Furthermore, it will be apparent that the form of stuffing box and nozzle specifically referred to admits of considerable variation without departure from the spirit of my invention as defined in the claims hereto annexed.

Having thus described my invention, I claim:

1. In combination with a dust box having an opening in a wall thereof, and a blow pipe adapted to penetrate said opening and to deliver a pressure jet within the dust box, of a dust collecting casing at said dust box wall around the opening therein, and means adjacent said blow pipe for directing a stream of air under pressure surrounding said blow pipe along the latter toward said opening, in opposition to the counterblast from said blow pipe.

2. In combination with a dust box having an opening in a wall thereof, and a blow pipe adapted to penetrate said opening and to deliver a pressure jet within the dust box, a stuffing box surrounding the blow pipe at said opening, a dust collecting casing at said dust box wall around said stuffing box, and annular nozzle means in said casing, around said blow pipe, for directing a stream of air under pressure surrounding the blow pipe along the same toward said stuffing box.

3. In combination with a dust box having an opening in a wall thereof, a blow pipe adapted to penetrate said opening and to deliver a pressure jet within the dust box, a stuffing box surrounding the blow pipe at said opening, a dust collecting casing mounted at said wall of the dust box and enclosing the opening therein and the stuffing box, and means adjacent said blow pipe for directing a stream of air under pressure surrounding said blow pipe along the latter through the interior of said casing toward said stuffing box.

4. In combination with a dust box having an opening in a wall thereof, a blow pipe adapted to penetrate said opening and to deliver a pressure jet within the dust box, a stuffing box having packing rings surrounding the blow pipe at said opening, a dust collecting casing mounted at said wall of the dust box and enclosing the opening therein and the stuffing box, and means adjacent said blow pipe for directing a stream of air under pressure surrounding said blow pipe through the packing rings of said stuffing box.

5. In combination with a dust box having an opening in a wall thereof, a blow pipe adapted to penetrate said opening and to deliver a pressure jet within the dust box, a stuffing box surrounding the blow pipe on the outside of said wall at said opening, a dust collecting casing mounted at said wall of the dust box and enclosing the opening therein and the stuffing box, said wall of the dust box having a passage beneath the stuffing box from the interior of the dust collecting casing to the dust box, and means adjacent said blow pipe for directing a stream of air under pressure surrounding said blow pipe through the interior of said casing and said stuffing box, and for also blowing the dust in said casing into the dust box through the passage aforesaid.

6. In combination with a dust box having an opening in the wall thereof, a blow pipe adapted to penetrate said opening and to deliver a pressure jet within the dust box, a stuffing box for the blow pipe at said opening, a dust collecting casing mounted at said wall of the dust box and enclosing the opening therein and the stuffing box, said stuffing box having perforations between the ends thereof leading to the interior of said casing, and means adjacent said blow pipe for directing a stream of air under pressure surrounding said blow pipe through the interior of said casing and the stuffing box, to oppose the counter blast at said stuffing box, said air stream also serving to blow dust through the perforations aforesaid.

7. In combination with a dust box having an opening in a wall thereof, a blow pipe adapted to penetrate said opening and to deliver a pressure jet within the dust box, a stuffing box for the blow pipe at said opening, a dust collecting casing mounted at said wall of the dust box and enclosing the opening therein and the stuffing box, said stuffing box having packing rings and a chamber therebetween with radial perforations leading to the interior of said casing, and means adjacent said blow pipe for directing a stream of air under pressure surroundng said blow pipe towards the stuffing box to oppose the counter blast at said stuffing box, said additional pressure jet serving to blow dust through the perforations aforesaid.

LOUIS A. CAMEROTA.